United States Patent [19]

Swearingen

[11] 3,895,810

[45] July 22, 1975

[54] MECHANICALLY ACTUATED TEMPORARY PUMP SHAFT MAINTENANCE SEAL

[75] Inventor: Judson S. Swearingen, San Antonio, Tex.

[73] Assignee: The United States of America as represented by the United States Energy Research and Development Administration, Washington, D.C.

[22] Filed: Mar. 15, 1948

[21] Appl. No.: 14,858

[52] U.S. Cl.................... 277/9 SR; 277/59; 277/71
[51] Int. Cl................................................ F16j 9/00
[58] Field of Search ............ 286/9, 11.12, 36; 277/9

[56] References Cited
UNITED STATES PATENTS

| | | | |
|---|---|---|---|
| 1,061,657 | 5/1913 | Bondy | 286/11.12 |
| 1,122,051 | 12/1914 | Wohlenberg | 286/9 |
| 1,871,661 | 8/1932 | Carrier | 286/9 |

FOREIGN PATENTS OR APPLICATIONS 182,441   11/1922   United Kingdom..................... 286/9

*Primary Examiner*—Samuel Feinberg
*Attorney, Agent, or Firm*—Roland A. Anderson; Harmon S. Potter; Dean E. Carlson

EXEMPLARY CLAIM

1. A temporary closure for a rotatable shaft passing through a wall of a housing comprising means defining a conical surface extending through said wall, an annular groove in said wall dividing the conical surface into an inner part, and an outer part, means for admitting gas under pressure to said annular groove, a conical collar on said shaft arranged to form a closure with said inner part of the conical surface only, tensioning means externally of the housing for applying axial tension on said shaft to bring said collar into sealing contact with said inner part, and clamping means engageable with the shaft and arranged to maintain the closure when said tensioning means are released.

3 Claims, 1 Drawing Figure

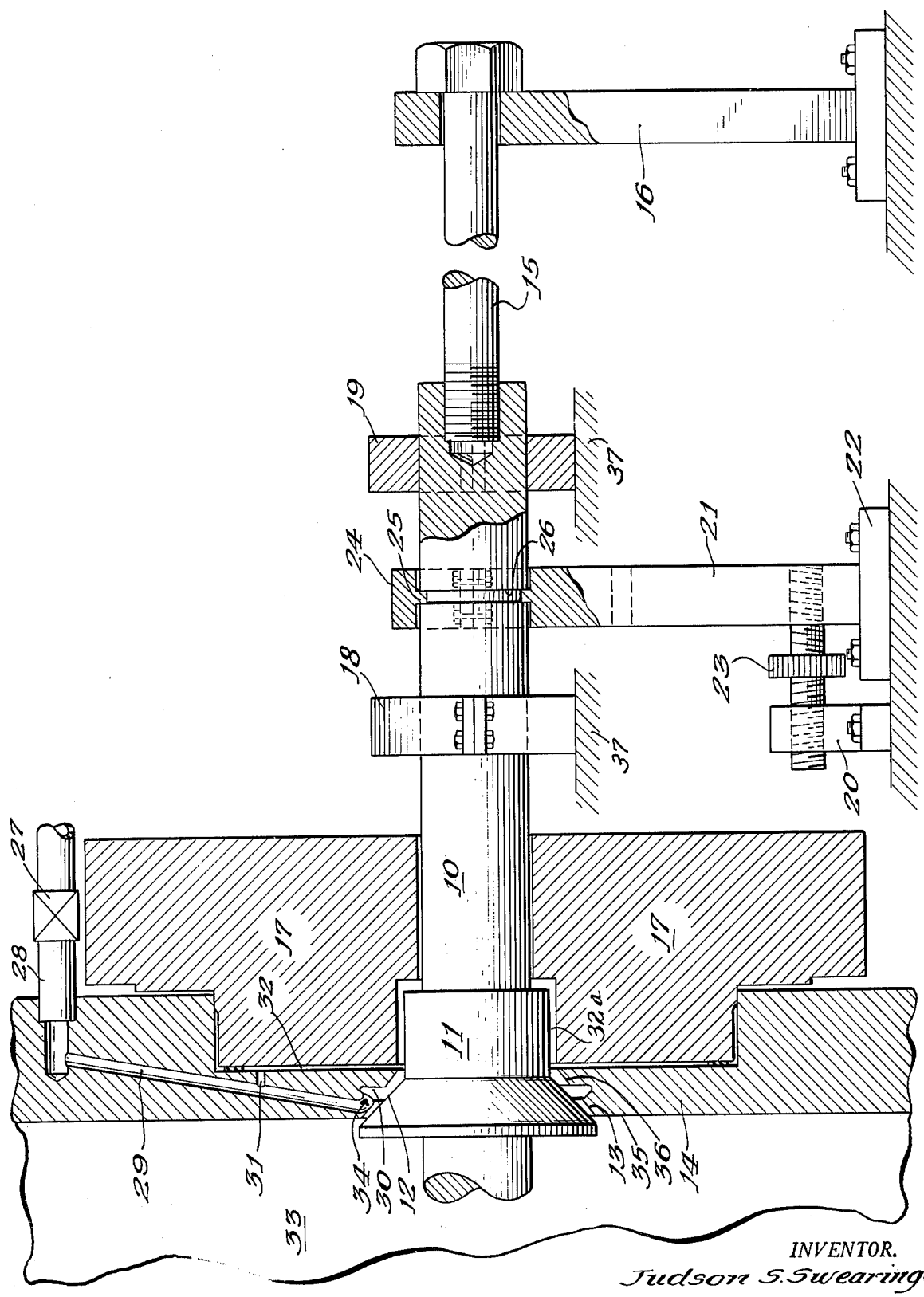

MECHANICALLY ACTUATED TEMPORARY PUMP SHAFT MAINTENANCE SEAL

The present invention relates to seals for rotating shafts and in particular it pertains to mechanically operated means for establishing a temporary closure about a shaft such as a shaft of a centrifugal pump or blower.

Heretofore when it has been necessary to repair or replace the seal or bearing of a pump shaft it has been necessary to partially disassemble the pump. Such an operation exposed large areas of the pump to the atmosphere and also permitted the gas in the pump to escape into the atmosphere. Where the pump gas was reactive with air or where such gas was corrosive or toxic, the prior art methods of changing the shaft seals or bearings were objectionable.

In order to overcome the objectionable features of the prior art, it is the object of this invention to provide a mechanically actuated temporary closure about a rotatable pump shaft which will permit removal of the shaft seals and bearings without disturbing the contents of the pump or permitting air to leak therein.

It is a further object of this invention to provide a temporary closure capable of speedy and convenient operation and the tightness of which is controllable by an externally applied mechanical force.

It is a further object of this invention to provide a temporaray closure that may be purged of pump gas by use of a small amount of purging fluid, the entrapped pump gas being swept into the pump and thereby saved.

It is a further object of this invention to provide a temporary closure having means for blanketing the closure with a purging fluid whereby leakage of air into the pump is effectively prevented.

The foregoing objects are attained by providing the pump shaft with a collar having a conical surface arranged to cooperate with a conical surface in the wall of the shaft housing to effect a closure. Means are arranged to exert an axial force on the shaft to maintain sealing contact between the conical surfaces, and suitable passages in the housing wall admit purging and sealing gas to the closure area.

The construction of the temporary closure forming the subject of the present invention is readily understood by reference to the drawing which shows a shaft such as might be used in a centrifugal blower equipped with a mechanically actuated closure in accordance with the present invention.

With reference to the FIGURE, shaft 10 is equipped with a collar 11 having a conical surface 12 which cooperates with a conical surface 35 of housing wall 14 to establish a temporary closure. Conical surface 35 forms a part of a larger surface 13 that is divided by an annular groove 30 into an inner part 35 and an outer part 36.

It should be noted that the conical surfaces 12, 13 diverge so that contact between the two is confined to the outer portion 35 of surface 13. Thus a closure is established between surface 12 and surface 13 which precludes or minimizes the flow of purge gas into the pump zone 33. If surfaces 13 and 36 were designed to simultaneously engage the conical surface 12, there would be the possibility that surface 36 would engage surface 12 first because of mechanical imperfections, and this would prevent the attainment of the best possible closure between surfaces 12 and 13 with the possible result that the inflow of purge gas into pump space 33 would be excessive.

Bolt 15, supported by a fixed pillar 16, threadedly engages the end of shaft 10 and applies axial tension thereon to bring surfaces 12, 35 into contact when a temporary closure is desired. In ordinary operation the bolt 15 is disconnected from the shaft, which is supported by conventional bearings diagramatically illustrated at 18 and 19. Such bearings are removably supported on a base 37, and they may be removed from shaft 10 by sliding them axially of the shaft towards the right as viewed in the drawing.

In order to facilitate removal of the shaft seal 17 and thrust bearings 18, 19 over the end of shaft 10, a temporary shaft clamping device is provided consisting of a fixed support 20, and a pillar 21 movable axially of the shaft by any suitable means such as a groove (not illustrated) in base 22 and turnbuckle 23. A conventional clamping ring 24 secured to the top of pillar 21 has an annular lock ring 25 that engages a groove 26 in shaft 10 and so prevents axial movement thereof when the seals and thrust bearings are being removed from the shaft.

A valve 27 controls flow of purge gas through conduit 28 and passage 29 to an annular groove 30 in the conical surface 13 of housing wall 14. Passage 31 connects the passage 29 with the zone 32 defined by the housing wall and the seal 17.

To remove the shaft seal 17 from shaft 10, bearing 19 is first removed from the shaft. Next, bolt 15 is threaded into the end of the shaft and tension is applied to bring conical surfaces 12 and 35 into contact, thereby establishing a temporary closure about the shaft. The trapped zone 32 is purged of pump gas by admitting a purge gas through passage 29, both before and during the contacting of surfaces 12 and 13. Purge gas enters the annular groove 30, whence about half of it blows into the pump space 33 and the remaining half blows into the zone 32a. The latter stream of gas eventually flows back through the opening between surfaces 12 and 13.

The arrangement of the annular groove 30 and passage 29 provides an exceptionally efficient and convenient means for purging the annular zones 32, 32a and 30. Zones which are more remote from the shaft axis are purged by way of passage 31.

Even after a closure has been established between surfaces 12 and 35, purge gas continues to flow through passage 29 and between surfaces 12 and 36. This blankets the closure between 12 and 35 and so precludes any flow of air into the pump should the closure at 12, 35 prove to be defective.

Once contact between surfaces 12 and 35 has been established and the closure purged in the manner described, thrust bearing 18 and seal 17 are released and slid over the end of shaft 10 and onto bolt 15. Next, turnbuckle 23 is adjusted until the clamp on pillar 21 is alined with the groove 26 in the shaft, and the clamp is secured. Clamp 24 now serves to maintain the closure at 12, 35 so that bolt 15 may be backed off and the seal 17 removed therefrom.

To replace the seal 17, the procedure used is the reverse of that employed to remove the seal. Thus with the seal removed and the temporary closure at 12, 35 being maintained by means of the clamp, bolt 15 is passed through a new seal 17 and bearings 18, 19.

Next, the bolt is threaded into the end of shaft 10 and tightened so that it will maintain the temporary closure when the clamp is released. The latter operation is now performed and the seal and bearings are slid axially of the shaft towards the left as viewed in the drawing. Once the seal and bearings are secured, the bolt 15 is unthreaded from shaft 10, releasing the temporary closure and readying the shaft for further service.

By means of the present invention a temporary closure may be affected in a minimum length of time and the closure may be blanketed by use of a minimal amount of gas.

I claim:

1. A temporary closure for a rotatable shaft passing through a wall of a housing comprising means defining a conical surface extending through said wall, an annular groove in said wall dividing the conical surface into an inner part, and an outer part, means for admitting gas under pressure to said annular groove, a conical collar on said shaft arranged to form a closure with said inner part of the conical surface only, tensioning means externally of the housing for applying axial tension on said shaft to bring said collar into sealing contact with said inner part, and clamping means engageable with the shaft and arranged to maintain the closure when said tensioning means are released.

2. A temporary closure for a rotatable shaft passing through a wall of a housing comprising means defining a conical surface extending through said wall, an annular groove in said wall dividing the conical surface into an inner part and an outer part, a passage in said wall adapted for connection with a source of fluid under pressure and communicating with said annular groove, a conical collar on said shaft arranged to form a closure with said inner part of the conical surface only, tensioning means externally of the housing for applying axial tension on said shaft to bring said collar into sealing contact with the inner part of the conical surface, and clamping means engageable with the shaft and arranged to maintain the closure when the tensioning means are released.

3. A temporary closure for a rotatable shaft passing through a wall of a housing comprising means defining a conical surface extending through said wall, an annular groove in said wall dividing the conical surface into an inner part and an outer part, a passage in said wall adapted for connection with a source of fluid under pressure and communicating with said annular groove, an aperture radially displaced from said annular groove, said aperture extending through a portion of the housing wall and communicating with said passage, a conical collar on said shaft arranged to form a closure with the inner part of the conical surface only, tensioning means externally of the housing for applying axial tension on said shaft to bring said collar into sealing contact with the inner part of the conical surface, and clamping means engageable with the shaft and arranged to maintain the closure when the tensioning means are released.

* * * * *